April 28, 1936.  R. R. SIMMONS  2,038,766
PIPE PRESSURE COUPLING
Filed Nov. 2, 1933  2 Sheets-Sheet 1

INVENTOR.
RAYMOND R. SIMMONS.
BY Lockwood Goldsmith & Galt
ATTORNEYS.

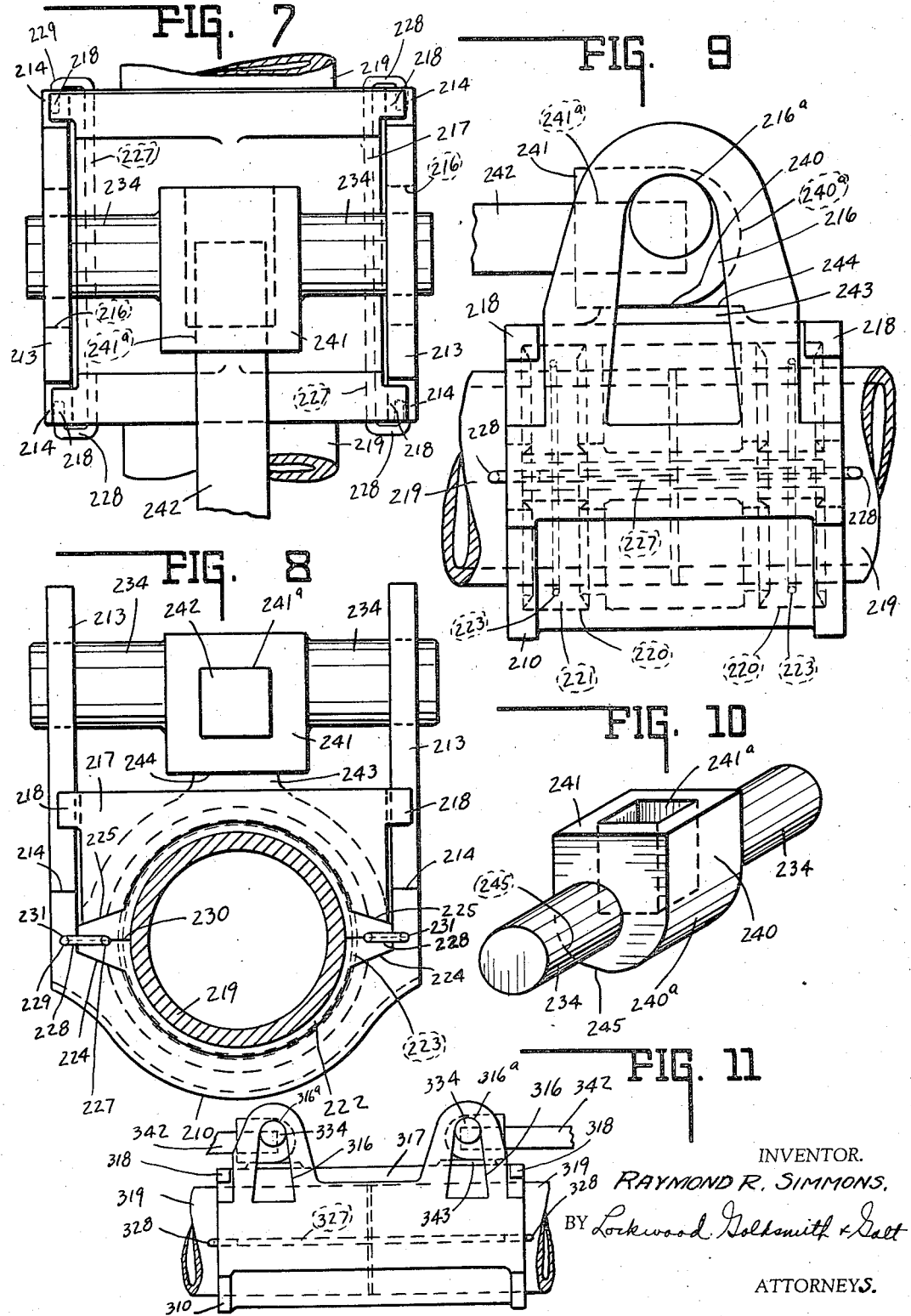

Patented Apr. 28, 1936

2,038,766

UNITED STATES PATENT OFFICE 2,038,766

PIPE PRESSURE COUPLING

Raymond Richard Simmons, Marion, Ind., assignor to Couplings, Inc., Huntington, Ind., a corporation Application November 2, 1933, Serial No. 696,366

25 Claims. (Cl. 285—194)

This invention relates to a pipe or tube coupling construction for connecting together two adjacent ends of pipe sections by a cradle and a clamp.

The chief object of the invention is to provide a construction of the aforesaid character, which is peculiarly suitable for operation on railroad trains and which will be of a leak-proof character.

Pipe sections coupled together by connections of this general character heretofore when used on railroads and in other places, for example along highway constructions and the like, due to vibration and due to changes in length of the total pipe line by reason of expansion and contraction, invariably either leak or do not have that length of life that is satisfactory, or both.

The present invention, as indicated, is directed to the solution of these difficulties and such solution is obtained by the association of certain parts with the cradle and the clamp, which cooperate together to seal and connect the pipe sections together.

One feature of the invention consists in the provision of a cam for actuating the clamp and causing the same to cooperate with the cradle for clamping in leakproof relation the pipe sections together and which cam has certain bearing areas that are so formed for the particular purpose hereinafter set forth.

Another feature of the invention consists in not only having the clamp relatively movable with respect to the cradle but having the same slidably guided by the cradle so that it will always register therewith in predetermined position.

A further feature consists in having the clamp detachably associated with the cradle.

Another feature of the invention consists in the provision of a resilient connection between the cooperating cam and the clamp.

Another feature of the invention consists in the detachable mounting of the cam, in one form of the invention, upon the cradle.

Another feature of the invention consists in the multiple peripheral seals and their particular conformation and their seating or association with the clamp and cradle.

A further feature of the invention consists in the metallic reenforcement of the projecting portion of the cushion providing the aforesaid peripheral seals.

A further feature of the invention consists in the provision of a longitudinal seal between the cradle and the clamp and which is wedged into contact with the adjacent pipe sections.

A further feature of the invention consists in interposing between cooperating adjacent longitudinal sealing portions of the immediately aforesaid character, an additional sealing member that is simultaneously imbeddable in both and which, if desired, may be supported by the clamp or the cradle and since two longitudinal seals are provided at opposite sides of the pipe, one may be supported by the clamp and the other by the cradle or both by either.

A further feature of the invention consists in the provision of a short actuating member for the cam that, when clampingly positioned, lies parallel to the pipe.

Still a further feature of the invention consists in providing a handle of the aforesaid character which is relatively short but which may be associated with an extension, the extension and said handle having a telescopic connection.

Still a further feature of the invention consists of a simplified form of connection between the clamp and the cam construction.

Other features of the invention not specifically herein before mentioned will appear more fully from the description set forth hereinafter.

The full nature of the invention will be understood from the accompanying drawings and the following description and claims:—

In the drawings Fig. 1 is a top plan view of the invention with the parts in the clamping position.

Fig. 2 is an end elevation of the same.

Fig. 3 is a side elevation of the same, parts being broken away to show other parts in section.

Fig. 4 is a top plan view of the cradle construction showing the opposite longitudinal metallic sealing members carried by the cradle.

Fig. 5 is a sectional view of the modified portion of a modified form of the invention.

Fig. 6 is a sectional view thereof, taken on line 6—6 of Fig. 5 and in the direction of the arrows.

Fig. 7 is a top plan view of a simplified and modified form of the invention of the parts in clamping position.

Fig. 8 is an end elevation of the same.

Fig. 9 is a side elevation of the same.

Fig. 10 is a perspective view of the unitary cam handle and head embodied therein.

Fig. 11 is a side elevational view on a smaller scale of a further modified form, illustrating the simplified form of the invention embodied in a dual construction for larger sizes of pipes or tubes.

In Figs. 1 to 4 of the drawings, 10 indicates a cradle construction having a pair of semi-circular end portions 11 spaced by a relieved portion 12.

Portions 11 constitute the seating portion of the cradle. Extending upwardly from the same at each side is a guide and support arrangement 13 which is reduced as at 14 to provide shoulders and a vertical way 15. The guide is recessed as at 16.

Detachably and slidably associated with the pair of spaced and parallel guides 13, is a clamp structure 17 having portions similar to portions 11 and relieved similarly as shown at 12 with respect to the cradle. The clamp 17 includes two oppositely directed pairs of spaced lugs 18 which are slidably associated with the ways 15 and are thus slidably supported by uprights 13 and are aligned thereby.

The two pipe seating portions complement each other and peripherally enclose the ends of adjacent pipe sections, herein indicated by the numeral 19. Each pipe seating portion of the cradle and the clamp is similarly formed and in Fig. 3 the sectioned portion illustrates such formation. Each portion 11 includes a groove 20, keystone shape in cross section. Seatable in said groove is a resilient cushion member 21 and projecting from the groove is an inwardly directed cushion portion 22 thereof. Included in the projecting portion and imbedded thereby, is a metallic reenforcement 23. Since the pipe 19 is shown circular, the seating portion, the groove 20 and the cushion member 22 are each semi-circular cylindrical in form.

The cradle includes the face 24 that extends longitudinally of the pipe 19 and opposite therefrom is a similar face 25 on the clamp. The two cooperate together and as shown clearly in Fig. 2, these faces are inclined inwardly toward the respective seating portions, thereby forming a pair of cooperating wedging faces 24 and 25 at each side of the coupling. Each of the semi-circular cushions mounted in the cradle and mounted in the clamp are connected by longitudinally directed cushion portions 26 and these two cushion portions 26 abut each other as at 30 and have their opposite faces engaged by the adjacent faces 24 and 25 of the cradle and clamp respectively. The result of this construction is that in the clamping action these faces 24 and 25 serve to wedge the cushion portions 26 inwardly along the longitudinal joint 30 and into pipe engagement forming a complete cylindrical or peripheral enveloping sleeve of a cushion and sealing character.

To insure positive sealing between the two longitudinal faces at joint 30, there is provided a longitudinally directed metallic member 27 having the parallel arm portions 28 terminating in inwardly directed ends 29 seatable in recesses 31 which, herein, are shown provided in the cradle member.

If desired, the recesses may be provided in the clamp or since two longitudinal sealing members 27 are provided at opposite sides of the longitudinal joint, one may be supported by the cradle and one may be supported by the clamp, as desired. It will be apparent that upon clamping action being obtained between the cradle and the clamp, that the longitudinally directed wire or metallic member 27 becomes partially imbedded in the two confronting opposed faces 30 of the longitudinal portions 26 of the cushion construction. Thus, a more perfect seal is provided. It is to be understood that the longitudinal cushion portion 26 is integral with the semi-circular keystone sectioned cushion portions 21 and said longitudinal portions 26 are connected to the same at opposite ends. This single unitary cushion arrangement is shown clearly in Fig. 4. The aforesaid constitutes the clamping and sealing portion embodied in all forms of the invention.

In Figs. 1 to 4, inclusive, the power means includes a head 33 which includes oppositely extending portions 34 that are slidably mounted in the openings 16 of the guide members 13. The projections 34 include the lug portions 35 which prevent accidental transverse displacement of the head, since the head is detachably associated with the cradle guides. The head 33 includes an opening 36 therein and adjacent the opening at each side is an upwardly directed portion or boss 37 apertured at 38. The two apertures 38—see Figs. 4 and 2—are in alignment and mount a pivot pin 39.

Pivotally supported by said pin is a cam 40 and integral therewith is a handle portion 41 that is adapted—see Fig. 3—to telescope into a pipe section 42 constituting a detachable extension for the handle. The handle 41 when in the clamping position—see Fig. 3—lies parallel to the pipe and thus is positioned for minimum interference.

In the form of the invention shown in Figs. 1 to 3, the clamp is shown provided with an integral boss 43 having a flat face 44 adapted to be engaged by the cam 40. The cam 40 is provided with several small flat portions 45 arranged in succession. The purpose of the same is to insure positive progressive seating as the annular cushions wear or lose their resiliency while in use.

In Figs. 5 and 6 there is illustrated a modified form of power means, and herein the parts bear similar numerals of the one hundred series. The cradle 110 includes the upright guides 113 providing the shoulders 114 and the ways 115. The clamp 117 provided with the lugs 118 and on its upper face, instead of the projecting portion 43, is provided with four integral annular lugs 143, having the seating portions 143a and the same nestingly receiving a plate spring 144. The head 133 has opposite projecting portions 134 that are slidably and detachably associated with the openings 116 in the guides. The head has the spaced portions or bosses 137 which support the pivot pin 139 that mounts the cam 140 having the flat portions 145.

In this form of the invention the handle portion 141 is provided with a socket 141a to receive a bar 142 constituting an extension of the handle. The socket may be of square or hexagonal outline in section and the handle naturally would be correspondingly formed or both might be circular as desired.

In Figs. 7 to 10 inclusive, there is illustrated a simplified form of the invention, and similar numerals of the two hundred series indicate similar or like parts therein. In this form of the invention, the upstanding guides 213 are provided with the openings 216 which terminate in the semi-circular portions 216a. The cradle structure otherwise is substantially the same as that shown in the preceding figures, and the clamp structure is substantially that shown in Figs. 1 to 3 inclusive.

The head structure and the power means is herein shown in simplified form and includes the opposite extensions 234 which are formed circular and constitute the equivalent of the pivot pin 39. The head structure, provided with the projecting bearing portion 234, includes the flat face 244. The axis of the cylindrical portions 234 is eccentric of the portion 241 providing a face 240 and a curved portion 240a that is eccentric to the axis of the extensions 234. Portion 241 includes the square socket 241a adapted to receive the squared end of an extension 242, 241 constituting the handle portion. It will be readily apparent that in this form of the invention the combined power means and head structure are detachable and naturally are also slidably associated with the walls of the opening 216.

In Fig. 11 there is illustrated a modified form of the invention wherein for larger size devices in order to secure more perfect clamping and sealing, particularly at the ends of the coupling clamp, there is provided a plurality of power means. In this form of the invention, the cradle 310 has extending upwardly therefrom a plurality, and herein a pair of spaced projections 213 each apertured as at 216, since this modification is illustrated as applied to the simplified form shown in Figs. 7 to 10 inclusive. The dual construction, however, may be applied with equal facility to the forms of the invention shown in Figs. 1 to 3 or Figs. 5 and 6, by utilizing the specific power means shown therein. It is to be understood that the invention broadly includes this dual construction with a plurality of power means of any of the modified forms before set forth or any other equivalent form.

In Fig. 11 associated with the cradle 310 is the clamp 317 having the cooperating lug portions 318. In each opposed pair of upstanding projections and mounted in the apertures 316 which are shown provided with semi-cylindrical portions 316a, there is mounted the projections 345 of cylindrical character, that are integral with the handle 341 having the arcuate portion 345 and the flat portion 340. The handle extension is indicated at 342. The clamp portion is provided with a projecting bearing portion in juxtaposition to the upstanding members 313 and the same is indicated by the numeral 343 and is engaged by the surface 340 for forcing the clamp into sealing engagement with the cradle. Since the two constructions are similar, although preferably oppositely directed, as shown in Fig. 11, no further description need be given relative to the other power means.

It is also to be understood that the wedge shaped grooves and the cushioning seals, shown particularly in the sectioned portion of Fig. 3, are likewise to be found in this construction adjacent the ends of both the cradle and the clamp and the longitudinal seals are also provided substantially as shown in sectioned portion of Fig. 3, and as shown in Fig. 4 in detail.

In all forms of the invention, therefore, the actual clamping construction may be the same as that initially set forth with reference to Figures 1 to 4 inclusive, and the power means associated therewith may be of the form shown in Figs. 1 to 3 inclusive, or the form shown in Figs. 5 and 6, or the form shown in Figs. 7 to 10 inclusive. In all three forms of power means, the head structure is not only slidably associated with the guide portions but is also detachably associated therewith. Also in all forms of the invention the clamp structure is slidably associated with the guide portions and is aligned thereby, and also is detachably associated therewith.

In all forms of the invention the handle structure has its longitudinal direction in alignment with the longitudinal direction of the pipe. In Fig. 5 there is provided an additional stop 100 for limiting the amount of compression applied to the plate spring 144.

While the invention has been set forth hereinbefore in considerable detail and various modifications thereof have been described and illustrated, the same is to be considered merely as illustrative thereof and not restrictive in character. The aforesaid modifications, as well as others which will readily suggest themselves to persons skilled in this art, are all considered to be within the scope of this invention, reference being had to the appended claims.

The invention claimed is:—

1. A pipe coupling device including a cradle member having a pipe seating portion and a pair of spaced guide portions, a clamp member having a pipe seating portion and slidably associated with the cradle guides and universally aligned thereby, a head supported by the cradle guide portions, and a manually operable cam pivotally supported by the head and operatively engaging the clamp for the purpose set forth.

2. A pipe coupling device including a cradle member having a pipe seating portion and a pair of spaced guide portions, a clamp member having a pipe seating portion and slidably and detachably associated with the cradle guide portions and universally aligned thereby, a head detachably associated with the cradle guide portions, and a manually operable cam pivotally supported by the head and operatively engaging the clamp for the purpose set forth.

3. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, and spaced cushion means in each of said grooves and projecting therefrom for pipe engagement, the grooves at the same end being in alignment.

4. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp for the purpose set forth, each of said pipe seating portions at opposite ends including a keystone shaped groove, and spaced cushion means in each of said grooves and projecting therefrom for pipe engagement, the grooves at the same end being in alignment.

5. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, and spaced cushion means in each of said grooves and projecting therefrom for pipe engagement, the grooves at the same end being in alignment, each of said groove seated cushion means including an imbedded metallic reenforcement in the projecting portion of said cushion means.

6. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp for the purpose set forth, each of said pipe seating portions at opposite ends including a keystone shaped groove, and spaced cushion means in each of said grooves and projecting therefrom for pipe engagement, the grooves at the same end being in alignment, each of said groove seated cushion means including an imbedded metallic reenforcement in the projecting portion of said cushion means.

7. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, the adjacent longitudinal edges of the seating portions being relieved inwardly, and a cushion portion connecting the spaced cushion means at opposite ends and clampingly associated together for pipe joint sealing.

8. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, the adjacent longitudinal edges of the seating portions being relieved inwardly, and a cushion portion connecting the spaced cushion means at opposite ends and clampingly associated together for pipe joint sealing.

9. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, each of said groove seated cushion means including an imbedded metallic reenforcement in the projecting portion of said cushion means, the adjacent longitudinal edges of the seating portions being relieved inwardly, and a cushion portion connecting the spaced cushion means at opposite ends and clampingly associated together for pipe joint sealing.

10. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, each of said groove seated cushion means including an imbedded metallic reenforcement in the projecting portion of said cushion means, the adjacent longitudinal edges of the seating portions being relieved inwardly, and a cushion portion connecting the spaced cushion means at opposite ends and clampingly associated together for pipe joint sealing.

11. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, the adjacent longitudinal edges of the seating portions being relieved inwardly, a cushion portion connecting the spaced cushion means at opposite ends and clampingly associated together for pipe joint sealing, and a metallic sealing means extending longitudinally between the adjacent connecting cushion portions and partially imbeddable in both upon pipe clamping engagement.

12. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, the adjacent longitudinal edges of the seating portions being relieved inwardly, a cushion portion connecting the spaced cushion means at opposite ends and clampingly associated together for pipe joint sealing, and metallic sealing means extending longitudinally between the adjacent connecting cushion portions and partially imbeddable in both upon pipe clamping engagement.

13. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, each of said groove seated cushion means including an imbedded metallic reenforcement in the projecting portion of said cushion means, the adjacent longitudinal edges of the seating portions being relieved inwardly, a cushion portion connecting the spaced cushion means at opposite ends and clampingly associated together for pipe joint sealing, and metallic sealing means extending longitudinally between the adjacent connecting cushion portions and partially imbeddable in both upon pipe clamping engagement.

14. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, each of said groove seated cushion means including an imbedded metallic reenforcement in the projecting portion of said cushion means, the adjacent longitudinal edges of the seating portions being relieved inwardly, a cushion portion connecting the spaced cushion means at opposite ends and clampingly associated together for pipe joint sealing, and metallic sealing means extending longitudinally between the adjacent connecting cushion portions and partially imbeddable in both upon pipe clamping engagement.

15. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp, and spring means interposed between the cam and clamp member.

16. A pipe coupling device including a cradle member having a pipe seating portion and a pair of spaced guide portions, a clamp member having a pipe seating portion and slidably and detachably associated with the cradle guide portions and aligned thereby, a head detachably associated with the cradle guide portions, a manually operable cam pivotally supported by the head and operatively engaging the clamp, and spring means interposed between the cam and clamp member.

17. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp, and spring means interposed between the cam and clamp member, said spring means comprising a plate spring, and means carried by the clamp for detachably nesting said plate spring.

18. A pipe coupling device including a cradle member having a pipe seating portion and a pair of spaced guide portions, clamp member having a pipe seating portion and slidably and detachably associated with the cradle guide portions and aligned thereby, a head detachably associated with the cradle guide portions, a manually operable cam pivotally supported by the head and operatively engaging the clamp, and spring means interposed between the cam and clamp member, said spring means comprising a plate spring, and means carried by the clamp for detachably nesting said plate spring.

19. A pipe coupling device including a cradle having a pipe seating portion and a pair of spaced and similarly projecting portions, a clamp having a complementary pipe seating portion and slidably associated with a cradle projecting portion and universally aligned thereby, a member associated with a projecting portion, and cam and handle means positioned between said portions and supported by said member, the cam portion operatively engaging the clamp for the purpose set forth.

20. A pipe coupling device including a cradle having a pipe seating portion and a pair of spaced and similarly projecting portions, a clamp having a complementary pipe seating portion and slidably associated with a cradle projecting portion and universally aligned thereby, a member detachably associated with the projecting portion, and cam and handle means positioned between said portions and supported by said member, the cam portion operatively engaging the clamp for the purpose set forth.

21. A pipe coupling device including a cradle having a pipe seating portion and a plurality of spaced projecting portions providing a plurality of aligned pairs of recesses, a clamp having a complementary pipe seating portion and slidably associated with the cradle and universally aligned thereby and having bearing means in alignment with the recesses, and a similar number of independent cam and handle power means each operatively associated with an adjacent pair of recesses for operative engagement of the cam with the bearing means of the clamp.

22. A pipe coupling device including a cradle member having a pipe seating portion and a pair pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, and spring means interposed between the cam and clamp member.

23. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a keystone shaped groove, spaced cushion means in each of said grooves and projecting therefrom for pipe engagement, the grooves at the same end being in alignment, spring means interposed between the cam and clamp member, said spring means comprising a plate spring, and means carried by the clamp for detachably nesting said plate spring.

24. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a groove, spaced cushion means in each of said grooves and projecting therefrom for pipe engagement, the grooves at the same end being in alignment, the adjacent longitudinal edges of the seating portions being relieved inwardly, a cushion portion connecting the spaced cushion means at opposite ends and clampingly associated together for pipe joint sealing, a metallic sealing means extending longitudinally between the adjacent connecting cushion portions and partially imbeddable in both upon pipe clamping engagement, said metallic sealing means being engagement, said metallic sealing means being carried by one of said members, and spring means interposed between the cam and clamp member.

25. A pipe coupling device including a cradle member having a pipe seating portion and a pair of spaced guide portions, a clamp member having a pipe seating portion and slidably associated with the cradle guides and aligned thereby, a head supported by the cradle guide portions, a manually operable cam pivotally supported by the head and operatively engaging the clamp for the purpose set forth, each of said pipe seating portions at opposite ends including a groove, spaced cushion means in each of said grooves and projecting therefrom for pipe engagement, the grooves at the same end being in alignment, the adjacent longitudinal edges of the seating portions being relieved inwardly, a cushion portion connecting the spaced cushion means at opposite ends and clampingly associated together for pipe joint sealing, a metallic sealing means extending longitudinally between the adjacent connecting cushion portions and partially imbeddable in both upon pipe clamping engagement, said metallic sealing means being carried by one of said members, spring means interposed between the cam and clamp member and comprising a plate type spring, and means carried by the clamp member for detachably nesting said plate spring.

RAYMOND RICHARD SIMMONS.